(12) United States Patent
Gray

(10) Patent No.: US 11,927,301 B1
(45) Date of Patent: Mar. 12, 2024

(54) SYSTEM AND METHOD FOR REINFORCING AN EXISTING WALL STRUCTURE TO SUPPORT HANGING A LOAD FROM THE WALL USING A SOLIDIFIABLE FIRE-RETARDANT COMPOSITION

(71) Applicant: Gerald R. Gray, Costa Mesa, CA (US)

(72) Inventor: Gerald R. Gray, Costa Mesa, CA (US)

( * ) Notice: Subject to any disclaimer, the term of this patent is extended or adjusted under 35 U.S.C. 154(b) by 0 days.

(21) Appl. No.: 18/201,176

(22) Filed: May 23, 2023

(51) Int. Cl.
*F16M 13/02* (2006.01)
*C09D 5/02* (2006.01)
*C09D 5/18* (2006.01)
*C09D 175/04* (2006.01)

(52) U.S. Cl.
CPC ............ *F16M 13/02* (2013.01); *C09D 5/021* (2013.01); *C09D 5/18* (2013.01); *C09D 175/04* (2013.01)

(58) Field of Classification Search
CPC ........... F16M 13/02; C09D 5/021; C09D 5/18
See application file for complete search history.

(56) References Cited

U.S. PATENT DOCUMENTS

| 8,240,103 | B2 | 8/2012 | Riepe | |
| 9,102,076 | B2 * | 8/2015 | Doshi | ..................... E04B 1/88 |
| 10,267,030 | B1 | 4/2019 | Lepage | |
| 2007/0164131 | A1 | 7/2007 | Kleba | |
| 2015/0376062 | A1 | 12/2015 | Reid | |
| 2017/0247591 | A1 | 8/2017 | Crain | |
| 2020/0140601 | A1 | 5/2020 | Tang | |
| 2021/0079646 | A1 | 3/2021 | Kreizinger | |

* cited by examiner

*Primary Examiner* — Lee A Holly
(74) *Attorney, Agent, or Firm* — Jafari Law Group, Inc.

(57) ABSTRACT

The invention is a system and method for reinforcing an existing wall structure to support hanging a load from a wall. By employing a solidifiable fire-retardant composition adapted to solidify inside a hollow wall structure, a structural support may be formed to provide a suitable support structure for hanging a medium to heavy load in lieu of an unavailable stud. In exemplary embodiments, a method may include the steps of (a) forming an aperture on a wall panel, the aperture providing access through a front surface of the wall panel to a cavity behind a back surface of the wall panel; (b) applying, inside the cavity, a solidifiable fire-retardant composition adapted to solidify inside the cavity through the aperture; (c) allowing the fire-retardant composition to solidify inside the cavity; and (d) anchoring one or more wall fasteners to the wall panel and to the solidified fire-retardant composition inside the cavity.

20 Claims, 5 Drawing Sheets

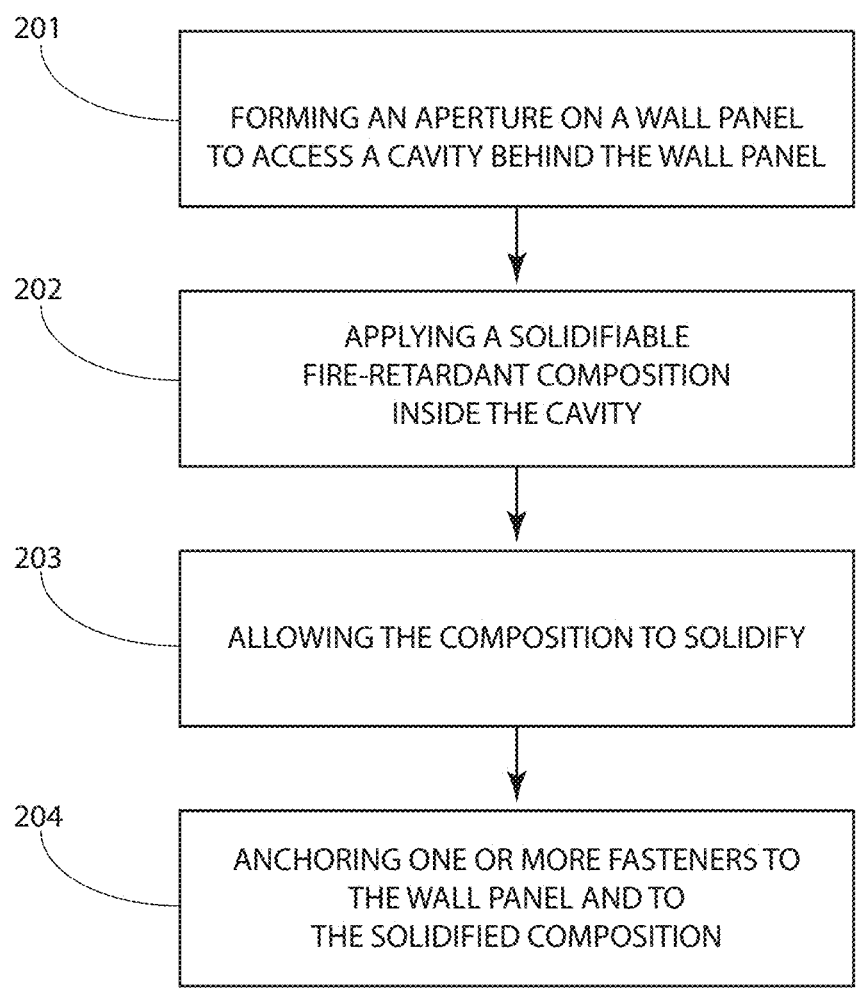

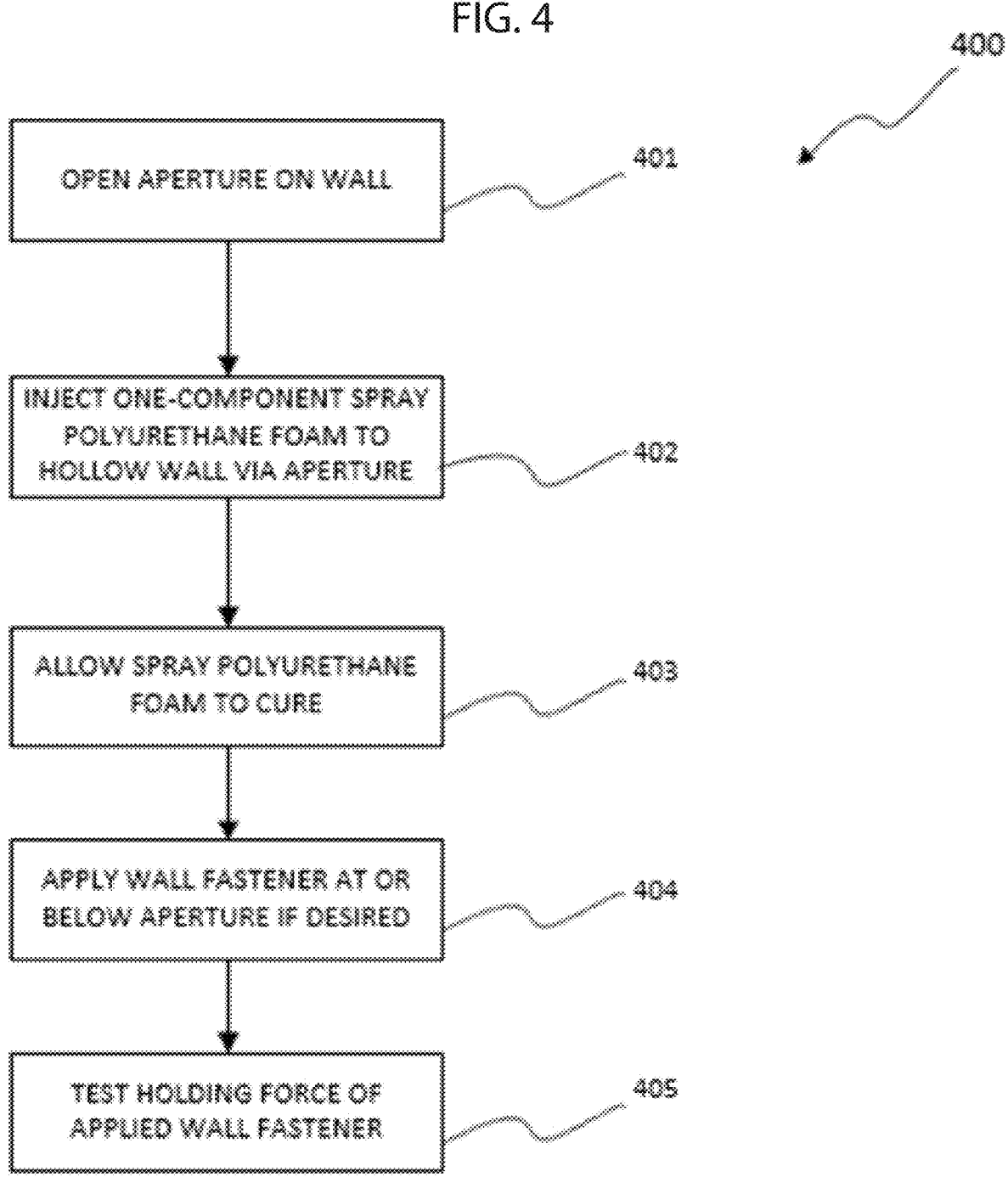

SYSTEM AND METHOD FOR REINFORCING AN EXISTING WALL STRUCTURE TO SUPPORT HANGING A LOAD FROM THE WALL USING A SOLIDIFIABLE FIRE-RETARDANT COMPOSITION

TECHNICAL FIELD OF THE INVENTION

The present disclosure relates generally to construction. More specifically, the invention relates to a system and method for reinforcing an existing wall structure to support hanging a load from the wall using a solidifiable fire-retardant composition. By employing a fire-retardant composition adapted to solidify inside a hollow wall structure, a structural support is provided suitable for hanging a medium to heavy load in lieu of an unavailable stud.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

The prior art is littered with fasteners, devices, and methods of hanging objects or support structures from walls. For example, the conventional method to achieve hanging medium to heavy objects from walls (e.g., flat screen televisions, heavy mirrors, large frames, art installations, or other medium to heavy loads desirably hung on a wall), requires that support structures, such as fasteners and the like are implemented. With medium to heavier loads, support structures are typically first coupled to wall studs or support beams of a structure in order to hang the medium to heavy loads from the supports that are coupled to the stud or support beam of the structure. In some circumstances, for example when there are no suitable studs or support beams to couple fasteners to, additional supports must be constructed into the wall prior to hanging the medium to heavy load. This generally requires the wall to be opened up, a supporting structure to be installed and secured inside the wall structure, the wall is then sealed, and the installed supporting structure is used to hang the medium to heavy load in lieu of the otherwise unavailable studs or support beams.

In addition to ensuring that the support structure (i.e., installed inside the wall prior to hanging the medium to heavy load from the wall) is sturdy, the installer must also ensure that the installation is compliant with building codes, including that the installation does not itself pose a fire hazard.

Clearly, these prior art methods take additional effort, materials, and time. Therefore, there is an unaddressed need for a system and method of reinforcing a wall structure so that it is suitable to hang medium to heavy loads without use of studs, in a manner that is efficient, code-compliant, and cost-effective. It is to these ends that the present invention has been developed.

SUMMARY OF THE INVENTION

To minimize the limitations in the prior art, and to minimize other limitations that will become apparent upon reading and understanding the present specification, the present invention describes a system and method for reinforcing an existing wall structure to support hanging a load from the wall using a solidifiable fire-retardant composition.

Generally, the invention involves an implementation of reinforcing a wall structure by filling a cavity behind an existing interior wall with a fire-retardant composition that can solidify once applied inside the cavity. In exemplary embodiments, the composition may be a high-density fire-retardant polyurethane foam. In some exemplary embodiments, the existing wall structure is framed up using wooden studs to which an interior wall panel made of gypsum drywall, fiberboard, or the like is attached. The reinforced wall structure provides a solution to applications of supporting or hanging heavy objects on a variety of applied wall fasteners. The present invention addresses and alleviates having to locate and use wall studs behind the existing wall panel for such applications. In accordance with the present invention, a high-density fire-retardant spray, for example a polyurethane, may be formulated.

In some exemplary embodiments, a one-component composition may be used, so that a user or installer need only apply a single composition. In some exemplary embodiments, a two-component composition may be applied. In exemplary embodiments, an isocyanate component and a polyol blend compound may be utilized.

One aspect of the present invention involves a method for reinforcing an existing wall structure to support hanging an object from a wall. The method may include the steps of: A method for reinforcing an existing wall of a structure to support hanging an object from the wall, comprising: forming an aperture on a wall panel, the aperture providing access through a front surface of the wall panel to a cavity behind a back surface of the wall panel; applying, inside the cavity, a solidifiable fire-retardant composition adapted to solidify inside the cavity through the aperture; allowing the fire-retardant composition to solidify inside the cavity; and anchoring one or more wall fasteners to the wall panel and to the solidified fire-retardant composition inside the cavity.

In some exemplary embodiments, the method may include the steps of: forming an aperture on a wall panel, the aperture providing access through a front surface of the wall panel to a cavity behind a back surface of the wall panel; injecting, inside the cavity, a solidifiable fire-retardant composition adapted to solidify inside the cavity through the aperture, wherein the aperture wherein is formed to snuggly receive an applicator of the solidifiable fire-retardant composition; allowing the fire-retardant composition to solidify inside the cavity; and anchoring one or more wall fasteners to the wall panel and to the solidified fire-retardant composition inside the cavity.

In some exemplary embodiments, the method may include the steps of: forming an aperture on a wall panel, the aperture providing access through a front surface of the wall panel to a cavity behind a back surface of the wall panel; injecting, inside the cavity, a solidifiable fire-retardant foam composition adapted to solidify inside the cavity through the aperture, wherein the aperture wherein is formed to snuggly receive an applicator of the solidifiable fire-retardant foam composition; allowing the fire-retardant foam composition to solidify inside the cavity; and anchoring one or more wall fasteners to the wall panel and to the solidified fire-retardant foam composition inside the cavity.

In some exemplary embodiments, applying the solidifiable fire-retardant composition comprises injecting the solidifiable fire-retardant composition through the aperture.

In some exemplary embodiments, allowing the fire-retardant composition to solidify inside the cavity includes allowing the solidifiable fire-retardant composition to expand inside the cavity.

In some exemplary embodiments, forming the aperture on the wall panel includes opening a hole on the wall panel. In exemplary embodiments, the aperture is sized to snuggly fit an applicator of the solidifiable fire-retardant composition.

In some exemplary embodiments, the method further includes hanging a load on the one or more wall fasteners without coupling the load to a stud or support beam of the structure.

In some exemplary embodiments, the method further includes testing a holding force or bearing load at the wall fastener.

In some exemplary embodiments, the wall panel is a vertical wall panel.

In some exemplary embodiments, the wall panel is an interior ceiling panel.

In some exemplary embodiments, the composition is a high-density foam spray.

BRIEF DESCRIPTION OF THE DRAWINGS

The composition and the method for using high-density fire-retardant SPF for reinforcing existing wall structures as disclosed herein, are further described in terms of exemplary embodiments. These embodiments are described in detail with reference to the drawings, which have not necessarily been drawn to scale, in order to enhance their clarity and improve understanding of the various embodiments of the invention. Furthermore, elements that are known to be common and well understood to those in the industry are not depicted in order to provide a clear view of the various embodiments of the invention. These embodiments are non-limiting exemplary embodiments, in which like reference numerals, represent similar structures throughout the several views of the drawings. The drawings that accompany the detailed description can be briefly described as follows:

FIG. 2 illustrates a block diagram describing an exemplary method in accordance with the present invention.

FIG. 4 depicts a block diagram of an overview of a process utilized for applying a one-component high-density fire-retardant SPF for reinforcing a wall, in accordance with the practice of exemplary embodiments of the present invention.

DETAILED DESCRIPTION OF THE INVENTION

Figure 1A:
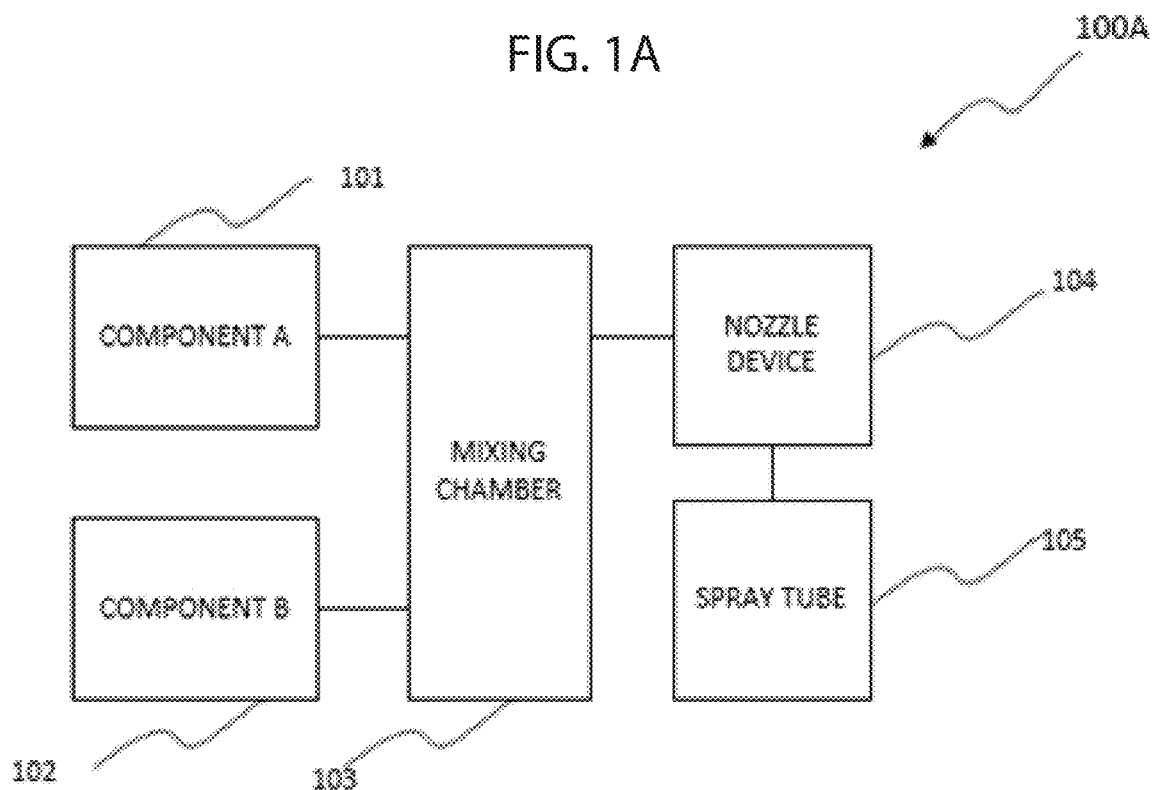
FIG. 1A illustrates a block diagram of a system in accordance with exemplary embodiments of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

In the following detailed description, numerous specific details are set forth by way of example in order to provide a thorough understanding of the relevant teachings. However, it should be apparent to those skilled in the art that the present teachings may be practiced without such details. In other instances, well known structures, components and/or functional or structural relationships thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and or steps are in any way required for one or more embodiments, whether these features, elements and/or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy. Similarly, terms, such as "a, an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel composition and methods described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, a composition of a high-density fire-retardant SPF and methods of use for reinforcing an existing wall structure. Exemplary embodiments of the present disclosure are described with reference to the drawings for illustration purposes and are not intended to limit the scope of the present disclosure.

Figure 1B:
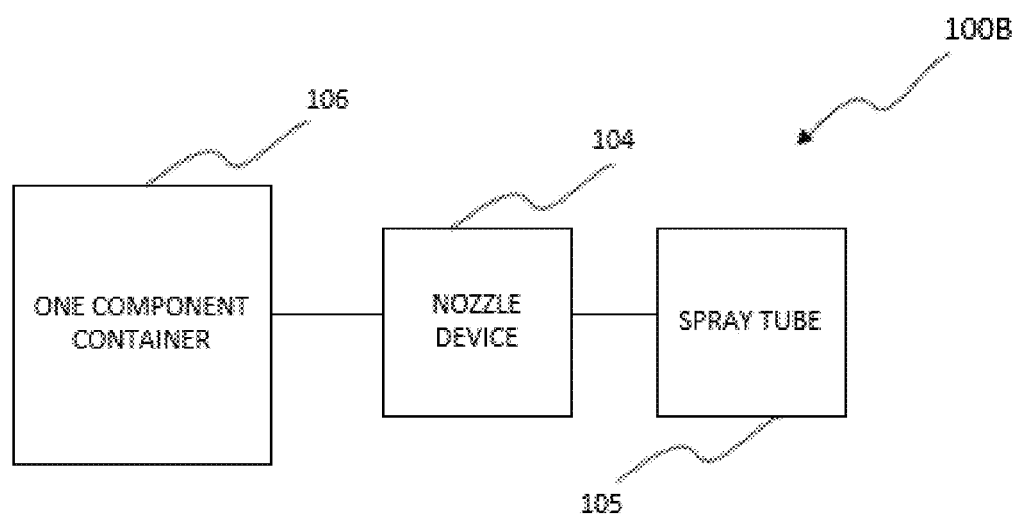
FIG. 1B illustrates a block diagram of a system in accordance with exemplary embodiments of the present invention.

Turning now to the figures, FIG. 1A and FIG. 1B, illustrate block diagrams of systems for reinforcing an existing wall of a structure to support hanging an object from the wall, in accordance with the present invention. As will be further described below, in some exemplary embodiments, the system may include a composition that comprises a foam or a spray such as a spray polyurethane foam (SPF). More specifically, FIG. 1A shows a two-component high-density fire-retardant system 100A, which is adapted to inject a reactive mixture of two components into a hollow wall through an aperture on the wall. In some exemplary embodiments, a component A 101 and a component B 102 may be pre-packaged in separate pressurized containers. In some exemplary embodiments, an external pressurization device (not shown) may be used. The component A 101 and the component B 102 may be connected to a mixing chamber 103 through a transfer tube made of any inert material which is nonreactive to the ingredients of the component A 101 or the component B 102. A fluid communication between the component A 101 or the component B 102 and the mixing chamber 103 may be controlled by a valve device (not shown) or the like. A nozzle device 104 is configured to be connected at its inlet end to the mixing chamber 103 and be connected at its outlet end to a spray tube 105. In some exemplary embodiments, the nozzle device comprises a trigger (not shown), and/or an adjuster (not shown) to control both an inflow rate of the reactive mixture from the mixing chamber 103 and a discharge flow rate to the spray tube 105. The spray tube is configured to be made of flexible or rigid material and to fit a size of an aperture (see FIG. 5A and FIG. 5B) on a wall and to reach a void behind the wall through the aperture, in accordance with the practice of exemplary embodiments of the present invention.

As may be appreciated from the block diagram of FIG. 1B, in exemplary embodiments, a one-component high-density fire-retardant SPF may be packaged in one pressurized container 106. The nozzle device 104 is configured to be disposed on the one pressurized container or to be connected with the pressurized container through a fluid transfer tube made of a type of inert material which is not reactive to the ingredients of the one-component composition of the high-density fire-retardant SPF. The spray tube has 105 one end connected to an outlet of the nozzle device 104, and another end is configured to discharge the one-component high-density fire-retardant SPF from the system 100B. The spray tube 105 may be configured to be either rigid, flexible, or adjustable in its position in relation to the nozzle device 104. The spray tube 105 is further configured to reach the cavity behind a wall through the aperture on the wall.

Turning now to FIG. 2, a block diagram describing an exemplary method in accordance with the present invention is illustrated. More specifically, FIG. 2 depicts method 200 for reinforcing an existing wall of a structure to support hanging an object from the wall. Although method 200 is exemplarily shown with a series of steps in one particular sequence, method 200 may include fewer or more steps in alternative sequences without deviating from the scope of the present invention.

In step 201, an aperture may be formed on a wall panel, the aperture providing access through a front surface of the wall panel to a cavity behind a back surface of the wall panel. This may be achieved by, for example and without limiting the scope of the present invention, drilling a small hole on the a surface of the wall panel in order to provide an opening (i.e., the aperture) that provides the installer with access to the cavity behind the wall. In some exemplary embodiments, the aperture is sized to snuggly fit an applicator of the solidifiable fire-retardant composition.

In step 202, a solidifiable fire-retardant composition adapted to solidify inside the cavity may be applied through the aperture. In some exemplary embodiments, applying the solidifiable fire-retardant composition comprises injecting the solidifiable fire-retardant composition through the aperture. In some exemplary embodiments, the composition is a high-density foam spray. In some exemplary embodiments, the composition is an SPF as described above. In some exemplary embodiments, the SPF is comprised of two parts: Part A, an isocyanate component, which contains a proportion of Methylene Diphenyl Diisocyanate (MDI), and a proportion of polyurea-based polymer, such as Polymethylene polyphenylene isocyanate (PPI); and Part B, a polyol resin blend, which contains a proportion of polyol, and smaller amounts and proportions of catalyst compound, blowing agent, surfactant and flame retardant.

In step 203, the fire-retardant composition may be allowed to solidify inside the cavity. In some exemplary embodiments, depending on the type of composition utilized, the composition may be sprayed and thus this step may include allowing the composition to expand inside the cavity.

In step 204, one or more wall fasteners may be anchored to the wall panel and to the solidified fire-retardant composition inside the cavity; this way, the desired object may be hung on the fasteners and secured to the solidified composition in lieu of having had to use studs or support beams of the structure. Accordingly, in some exemplary embodiments, the method further includes hanging a load on the one or more wall fasteners without coupling the load to a stud or support beam of the structure.

In some exemplary embodiments, the method further includes testing a holding force or bearing load at the wall fastener. In some exemplary embodiments, the wall panel is a vertical wall panel. In some exemplary embodiments, the wall panel is an interior ceiling panel.

Accordingly, in some exemplary embodiments, a method for reinforcing an existing wall of a structure to support hanging an object from the wall, may include: (a) forming an aperture on a wall panel, the aperture providing access through a front surface of the wall panel to a cavity behind a back surface of the wall panel; (b) applying, inside the cavity, a solidifiable fire-retardant composition adapted to solidify inside the cavity through the aperture; (c) allowing the fire-retardant composition to solidify inside the cavity; and (d) anchoring one or more wall fasteners to the wall panel and to the solidified fire-retardant composition inside the cavity In some exemplary embodiments, the method may include: (a) forming an aperture on a wall panel, the aperture providing access through a front surface of the wall panel to a cavity behind a back surface of the wall panel; (b) injecting, inside the cavity, a solidifiable fire-retardant composition adapted to solidify inside the cavity through the aperture, wherein the aperture wherein is formed to snuggly receive an applicator of the solidifiable fire-retardant composition; (c) allowing the fire-retardant composition to solidify inside the cavity; and (d) anchoring one or more wall fasteners to the wall panel and to the solidified fire-retardant composition inside the cavity.

In some exemplary embodiments, the method may include: (a) forming an aperture on a wall panel, the aperture providing access through a front surface of the wall panel to a cavity behind a back surface of the wall panel; (b) injecting, inside the cavity, a solidifiable fire-retardant foam composition adapted to solidify inside the cavity through the aperture, wherein the aperture wherein is formed to snuggly receive an applicator of the solidifiable fire-retardant foam composition; (c) allowing the fire-retardant foam composition to solidify inside the cavity; and (d) anchoring one or more wall fasteners to the wall panel and to the solidified fire-retardant foam composition inside the cavity.

Figure 3:
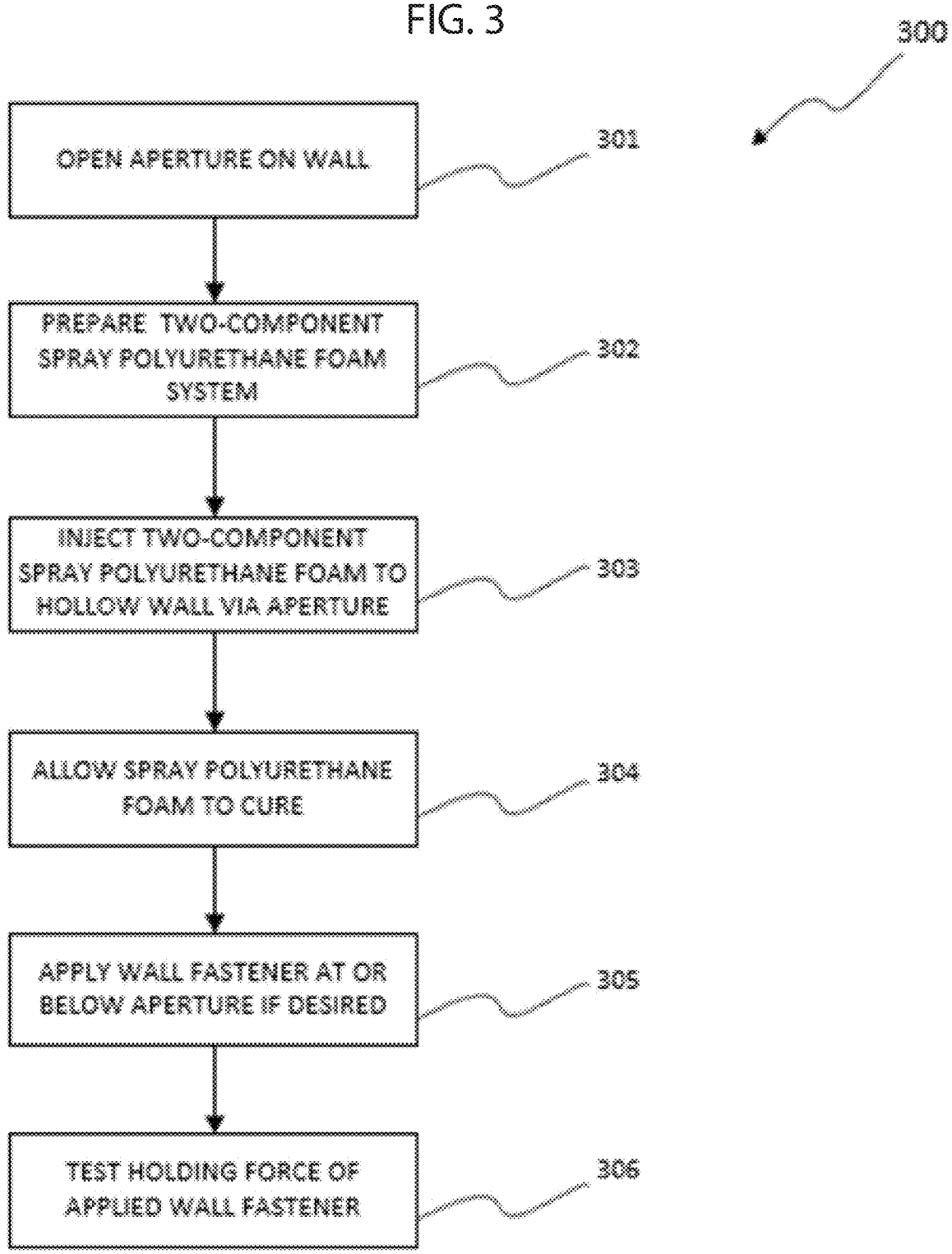
FIG. 3 depicts a block diagram of an overview of a process utilized for applying a two-component high-density fire-retardant SPF for reinforcing a wall, in accordance with the practice of exemplary embodiments of the present invention.

Turning now to the next figures, FIG. 3 and FIG. 4 depict block diagrams of an overview of the process utilized for applying a high-density fire-retardant SPF in accordance with some exemplary embodiments of the present invention. More specifically, FIG. 3 depicts method 300 for applying a two-component high-density fire-retardant SPF for reinforcing a wall structure. FIG. 4 depicts method 400 for applying a one-component high-density fire-retardant SPF for reinforcing a wall structure. Although method 300 or 400 is exemplarily shown with a series of steps in one particular sequence, method 300 or 400 may include fewer or more steps in alternative sequences without deviating from the scope of the present invention.

In step 301, a user should first open an aperture at a desired location of a wall. The desired location is determined by the user's needs where a holding force is required to support a heavy object on the wall and in a general area where a wall fastener will be applied. In an exemplary embodiment, this will include creating an aperture at a desired location on the wall, removing debris and foreign material from the drilling process, ensuring the aperture connects to the cavity behind the wall. In another exemplary embodiment, this will further include selecting an appropriate size of the aperture, and measuring the thickness of the wall and the depth of the cavity behind the wall.

In step 302, the user should prepare a two-component high-density fire-retardant SPF system. This can be achieved by connecting each of two individually-packed containers to a mixing chamber through fluid transfer tubes, wherein the mixing chamber is configured to be actuated by a nozzle device to allow ingredients of the two individually-packed containers to mix at a common connection of the nozzle device. The nozzle device is configured to connect the mixing chamber at one end of the nozzle device and to connect to a spray tube at another end. The nozzle device discharges mixed ingredients to the end that connects the spray tube.

In step 303, the user may inject the mixture of the two-component high-density fire-retardant SPU to the vertical cavity behind the wall through the aperture made in step 301. This step may include adjusting the spray tube's position in relation to the aperture, and routing the spray tube through the aperture to reach a sufficient depth of the vertical cavity behind the wall. In step 303, a desired quantity of mixture may be injected to fill the space of the cavity. In some exemplary embodiments where the two-component mixture is injected to a ceiling as opposed to a vertical wall, less quantity of mixture may be applied to reinforce an immediate horizontal cavity above the ceiling.

In step 304, the injected mixture of the two-component high-density fire-retardant SPU reacts to expand and adhere to the surrounding construction material in the cavity (e.g., wooden or metal frame, gypsum drywall, fiberboard or the like). The injected mixture further solidifies as a result of its curing process and forms a cured high-density fire-retardant polyurethane foam.

In step 305, the user applies a plurality of wall fasteners in the area of wall where the cavity behind has been reinforced by the solidified high-density fire-retardant polyurethane foam.

In step 306, the user should test the holding force of the applied wall fastener. In this step, the user may need to adjust the penetration depth of the wall fastener to ensure sufficient holding force can be achieved. In an exemplary embodiment, the fasteners applied to the wall and penetrate in sufficient depth of the solidified high-density fire-retardant polyurethane foam, is capable of holding a heavy weight object such as a framed mirror, or a television screen.

FIG. 4 depicts a block diagram of an overview of method 400 in applying a one-component high-density fire-retardant SPF. In step 401, a user should first open an aperture at a desired location of a wall. The desired location is determined by the user's needs, where a holding force is required to support a heavy object on the wall and in a general area where a wall fastener will be applied. In an exemplary embodiment, this will include creating an aperture at a desired location on the wall, removing debris and foreign material from the drilling process, ensuring the aperture connects to the cavity behind the wall. In another exemplary embodiment, this will further include selecting an appropriate size of the aperture, and measuring the thickness of the wall and the depth of the cavity behind the wall.

In step 402, the user may inject the mixture of the two-component high-density fire-retardant SPU to the vertical cavity behind the wall through the aperture made in step 401. This step may include adjusting the spray tube's position in relation to the aperture, and routing the spray tube through the aperture to reach a sufficient depth of the vertical cavity behind the wall. In step 402, the one-component high-density fire-retardant SPF may be injected to a desired quantity to fill the space of the cavity. In some exemplary embodiments where the one-component SPF is injected into a ceiling as opposed to a vertical wall, less quantity of SPF may be applied to reinforce an immediate horizontal cavity above the ceiling.

In step 403, the injected one-component high-density fire-retardant SPU reacts to expand and adhere to the surrounding construction material in the cavity (e.g., wooden or metal frame, gypsum drywall, fiberboard or the like). The injected SPF further solidifies as a result of its curing process and forms a cured high-density fire-retardant polyurethane foam.

In step 404, the user applies a plurality of wall fasteners in the area of wall where the cavity behind has been reinforced by the solidified high-density fire-retardant polyurethane foam.

In step 405, the user should test the holding force of the applied wall fastener. In this step, the user may need to adjust the penetration depth of the wall fastener to ensure sufficient holding force can be achieved. In an exemplary embodiment, the fasteners applied to the wall and penetrates in sufficient depth of the solidified high-density fire-retardant polyurethane foam, is capable of holding a heavy weight object such as a large framed mirror or a TV screen.

Figure 5A:
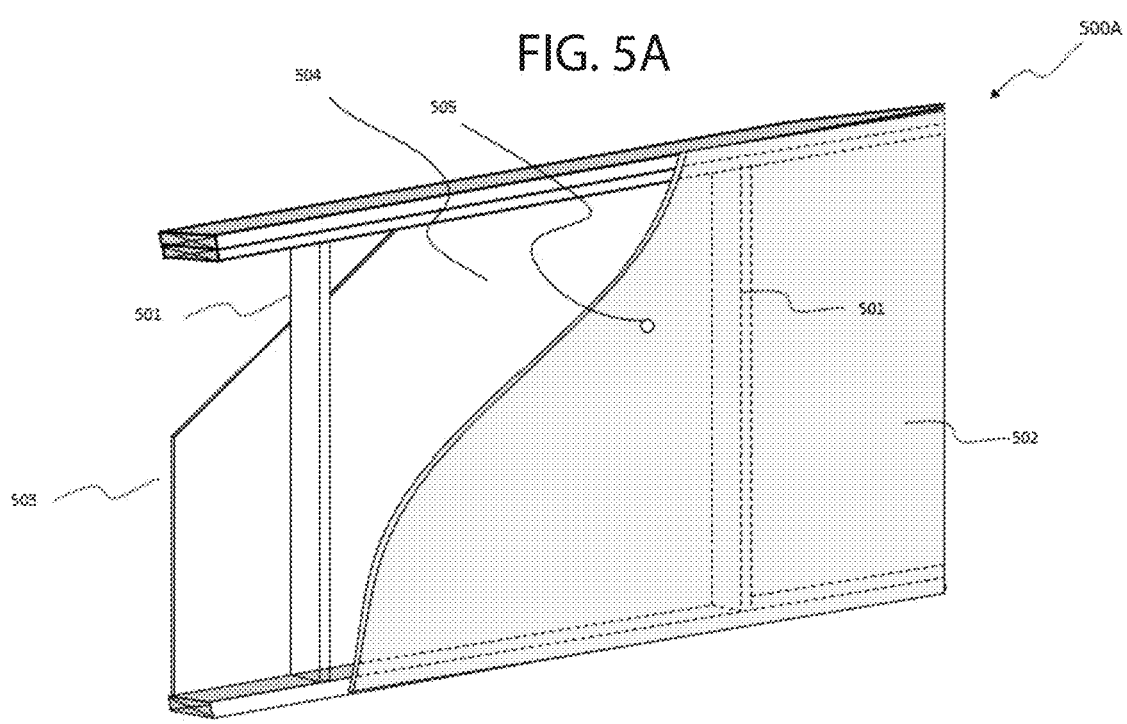
FIG. 5A illustrates a perspective view of a wall structure, in accordance with the practice of exemplary embodiments of the present invention.
Figure 5B:
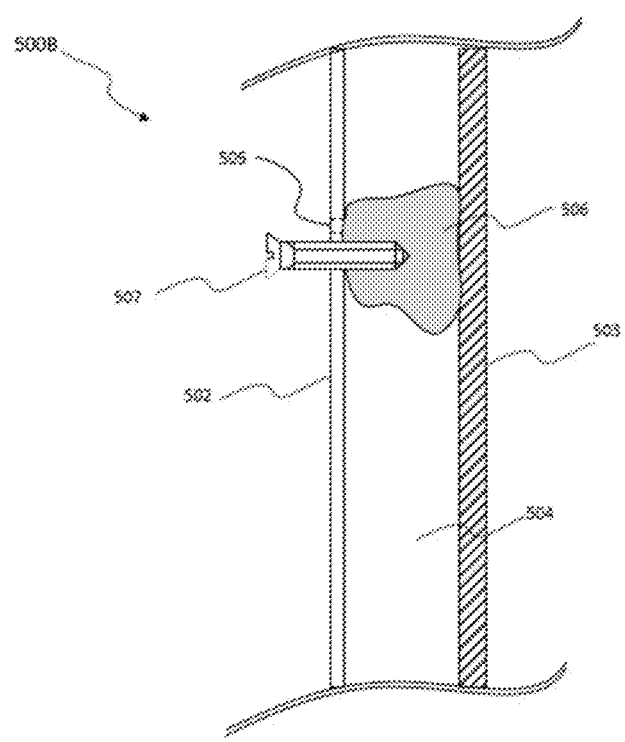
FIG. 5B illustrates a cross-section view of a wall structure, as depicted in FIG. 5A, and a cross-section view of an application of high-density fire-retardant SPF for reinforcing an existing wall structure, in accordance with exemplary embodiments of the present invention.

Turning now to FIG. 5A and FIG. 5B. FIG. 5A illustrates a perspective view of a wall structure to which methods 300 and 400 may be applied to in accordance with practice of some embodiments of the present invention.

The application of the high-density fire-retardant SPF is to achieve an in-place reinforcement of a cavity behind an existing wall and to provide sufficient holding force for supporting heavy objects. In an exemplary embodiment, an existing wall structure 500A is constructed with wooden studs 501, an interior wall panel 502, and an exterior wall material 503. The traditional interior wall panels 502 are made of gypsum drywall, fiberboard, or the like and are attached to the wooden studs 501. The application of hanging heavy objects through a wall fastener (e.g., screws, bolts, cleat hangers) must be limited to the location of wooden studs 501. The present invention is advantageous to allow the positioning of the heavy objects at any location of the wall as opposed to only limited to where wooden studs 501 are located. In an exemplary embodiment, a user may select a location on the wall for hanging a heavy weight object without locating the wooden studs 501. The user may select an area where only a vertical cavity 504 was behind the wall. The user may follow the general steps 300 and 400 to inject high-density fire-retardant SPF through an aperture 505 created within a proximity of the user's selected area.

FIG. 5B illustrates a cross-section view of a wall structure, as depicted in FIG. 5A, and a cross-section view of an application of high-density fire-retardant SPF for reinforcing an existing wall structure, in accordance with exemplary embodiments of the present invention.

In some exemplary embodiments, the high-density fire-retardant SPF is injected through an aperture 505 on an interior wall panel 502. Generally, the SPF reacts with the ambient moisture in the cavity 504, and further expands and adheres to the front side of the exterior wall material 503 and the back side of the interior wall panel 502. Once solidified, the cured high-density fire-retardant polyurethane foam 506 provides in-place reinforcement of the cavity. The user may apply a wall fastener 507 which penetrates the cured high-density fire-retardant polyurethane foam 506 in sufficient depth to achieve a holding force from the cured high-density fire-retardant polyurethane and consequently to use the applied wall fastener 507 for supporting or hanging heavyweight objects.

The foregoing detailed description has set forth a composition of the present invent and/or methods thereof by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples may be implemented, individually and/or collectively, by a wide range of materials, compositions, methods, techniques, or virtually any combination thereof.

Those skilled in the art will recognize that it is common within the art to describe systems and/or methods in the fashion set forth herein, and thereafter use engineering practices to integrate such described systems and/or methods into other similar systems. That is, at least a part of the systems and/or methods described herein may be integrated into a cement-based coating system and/or method via a reasonable amount of experimentation.

The subject matter described herein sometimes illustrates different components contained within, or connected with, other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for the sake of clarity.

A composition and method for a high-density fire-retardant spray polyurethane foam has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A method for reinforcing an existing wall of a structure to support hanging an object from the wall, comprising:
   forming an aperture on a wall panel, the aperture providing access through a front surface of the wall panel to a cavity behind a back surface of the wall panel;
   applying, inside the cavity, a solidifiable fire-retardant composition adapted to solidify inside the cavity through the aperture;
   allowing the fire-retardant composition to solidify inside the cavity; and
   anchoring one or more wall fasteners to the wall panel and to the solidified fire-retardant composition inside the cavity.

2. The method of claim 1, wherein forming the aperture on the wall panel includes opening a hole on the wall panel.

3. The method of claim 2, wherein the hole is sized to snuggly fit an applicator of the solidifiable fire-retardant composition.

4. The method of claim 1, wherein applying the solidifiable fire-retardant composition comprises injecting the solidifiable fire-retardant composition through the aperture.

5. The method of claim 1, wherein allowing the fire-retardant composition to solidify inside the cavity includes allowing the solidifiable fire-retardant composition to expand inside the cavity.

6. The method of claim 1, further comprising:
hanging a load on the one or more wall fasteners without coupling the load to a stud or support beam of the structure.

7. The method of claim 1, further comprising:
testing a holding force or bearing load at the wall fastener.

8. The method of claim 1, wherein the wall panel is a vertical wall panel.

9. The method of claim 1, wherein the wall panel is an interior ceiling panel.

10. The method of claim 1, wherein the composition is a high-density foam spray.

11. A method for reinforcing an existing wall of a structure to support hanging an object from the wall, comprising:
forming an aperture on a wall panel, the aperture providing access through a front surface of the wall panel to a cavity behind a back surface of the wall panel;
injecting, inside the cavity, a solidifiable fire-retardant composition adapted to solidify inside the cavity through the aperture, wherein the aperture wherein is formed to snuggly receive an applicator of the solidifiable fire-retardant composition;
allowing the fire-retardant composition to solidify inside the cavity; and
anchoring one or more wall fasteners to the wall panel and to the solidified fire-retardant composition inside the cavity.

12. The method of claim 11, wherein allowing the fire-retardant composition to solidify inside the cavity includes allowing the solidifiable fire-retardant composition to expand inside the cavity.

13. The method of claim 11, further comprising:
hanging a load on the one or more wall fasteners without coupling the load to a stud or support beam of the structure.

14. The method of claim 11, further comprising:
testing a holding force or bearing load at the wall fastener.

15. The method of claim 11, wherein the wall panel is a vertical wall panel.

16. The method of claim 11, wherein the wall panel is an interior ceiling panel.

17. The method of claim 11, wherein the composition is a high-density foam spray.

18. The method of claim 11, further comprising:
hanging a load on the one or more wall fasteners without coupling the load to a stud or support beam of the structure; or
testing a holding force or bearing load at the one or more wall fasteners.

19. The method of claim 11, wherein the wall panel is a vertical wall panel or a ceiling panel.

20. A method for reinforcing an existing wall of a structure to support hanging an object from the wall, comprising:
forming an aperture on a wall panel, the aperture providing access through a front surface of the wall panel to a cavity behind a back surface of the wall panel;
injecting, inside the cavity, a solidifiable fire-retardant foam composition adapted to solidify inside the cavity through the aperture, wherein the aperture wherein is formed to snuggly receive an applicator of the solidifiable fire-retardant foam composition;
allowing the fire-retardant foam composition to solidify inside the cavity; and
anchoring one or more wall fasteners to the wall panel and to the solidified fire-retardant foam composition inside the cavity.

* * * * *